US011975564B2

(12) United States Patent
Breneman et al.

(10) Patent No.: US 11,975,564 B2
(45) Date of Patent: May 7, 2024

(54) PAINT TRAY LINER AND LID

(71) Applicant: The Wooster Brush Company, Wooster, OH (US)

(72) Inventors: Brett A. Breneman, Wooster, OH (US); James M. Byrne, Wooster, OH (US)

(73) Assignee: The Wooster Brush Company, Wooster, OH (US)

( * ) Notice: Subject to any disclaimer, the term of this patent is extended or adjusted under 35 U.S.C. 154(b) by 0 days.

(21) Appl. No.: 17/846,374

(22) Filed: Jun. 22, 2022

(65) Prior Publication Data

US 2022/0410618 A1 Dec. 29, 2022

Related U.S. Application Data

(60) Provisional application No. 63/214,031, filed on Jun. 23, 2021.

(51) Int. Cl.
*B65D 21/032* (2006.01)
*B05C 21/00* (2006.01)
*B44D 3/12* (2006.01)

(52) U.S. Cl.
CPC ............. *B44D 3/126* (2013.01); *B44D 3/128* (2013.01)

(58) Field of Classification Search
CPC ........ B44D 3/125; B44D 3/126; B44D 3/128; B44D 3/127; B44D 3/00; B05C 17/0245; B65D 21/0234
USPC ....... 220/4.24, 4.21, 4.27, 570, 697, 495.08; D32/53.1, 54
See application file for complete search history.

(56) References Cited

U.S. PATENT DOCUMENTS 2,764,308 A 9/1956 Hoch
2,899,097 A 8/1959 Haskins
(Continued)

FOREIGN PATENT DOCUMENTS

CA 2629676 A1 10/2009
CA 2643384 C 7/2011
CA 2598236 C 9/2011

OTHER PUBLICATIONS

Sherwin Williams, "Purdy NEST paint tray liner," retrieved Apr. 6, 2021, https://www.lowes.com/pd/Purdy-3-Pack-16-25-in-x-27-in-Paint-Tray-Liner/1000544591.

*Primary Examiner* — Gideon R Weinerth
(74) *Attorney, Agent, or Firm* — Renner, Otto, Boisselle & Sklar, LLP

(57) ABSTRACT

A container liner that can be flipped on top of another same liner to provide a liner-lid combination that forms an enclosure for storing a coating and/or coating utensil therewithin. The sidewalls of the liner provide an upper rim with upper mating face which engages against the corresponding upper mating face of another same liner to form a face seal along a majority of the upper rim. The opposingly interfaced liners form a section in which the ribs of the respective liners are in juxtaposition to each other in a laterally spaced apart relationship to define a through-opening that is configured to permit a portion of a coating utensil such as a paintbrush to extend therethrough. In addition, the liners may have a feature which allows the same liners to be nested while facing the same direction, allowing for ease of storage while the liners are not forming an enclosure.

15 Claims, 9 Drawing Sheets

(56) References Cited

U.S. PATENT DOCUMENTS

| | | | | | |
|---|---|---|---|---|---|
| 2,999,611 | A * | 9/1961 | Paulson | B65D 43/021 | 220/4.24 |
| 4,445,250 | A * | 5/1984 | Seidl | B44D 3/12 | 220/570 |
| 4,974,738 | A * | 12/1990 | Kidd | B65D 21/0234 | 220/4.24 |
| 5,205,413 | A * | 4/1993 | Cautereels | B65D 25/205 | 206/541 |
| 5,390,807 | A * | 2/1995 | Galaburda | B65D 11/188 | 220/4.24 |
| 5,533,228 | A * | 7/1996 | Jarecki | B44D 3/127 | 220/570 |
| 5,645,164 | A * | 7/1997 | Hocking | B44D 3/126 | 206/209 |
| D400,329 | S * | 10/1998 | Lindo | D32/54 | |
| 5,862,930 | A | 1/1999 | Orkisz | | |
| 5,966,902 | A * | 10/1999 | Korycki | B65D 75/22 | 206/209 |
| 6,196,410 | B1 | 3/2001 | Hocking | | |
| 6,530,470 | B2 * | 3/2003 | Roundy | B44D 3/125 | 206/209 |
| 6,622,884 | B1 * | 9/2003 | Gartner | B05C 17/0245 | 220/570 |
| 6,711,989 | B1 * | 3/2004 | Sarnoff | B65D 21/0234 | D7/354 |
| 6,923,338 | B2 * | 8/2005 | Dees | B65D 11/188 | 220/4.24 |
| D583,521 | S * | 12/2008 | Arvinte | B65D 25/105 | D32/53.1 |
| 7,648,022 | B1 * | 1/2010 | Freeauf | B44D 3/126 | 220/570 |
| D627,120 | S * | 11/2010 | Davidson | D32/54 | |
| 7,854,341 | B2 * | 12/2010 | Martin | B44D 3/126 | 220/4.27 |
| 7,882,974 | B2 | 2/2011 | Evans et al. | | |
| 7,963,418 | B2 | 6/2011 | Arvinte et al. | | |
| 8,074,796 | B1 * | 12/2011 | Andrews | B65D 25/105 | 206/565 |
| D654,644 | S * | 2/2012 | Davidson | D32/54 | |
| 8,256,638 | B2 | 9/2012 | Arvinte et al. | | |
| 8,561,823 | B1 * | 10/2013 | Krupa | B65D 21/0234 | 220/4.24 |
| 10,494,155 | B2 * | 12/2019 | Snedden | B65D 43/0204 | |
| 10,787,029 | B2 | 9/2020 | Robertson et al. | | |
| 2005/0252920 | A1 * | 11/2005 | Cumming | B44D 3/126 | 206/229 |
| 2009/0050632 | A1 * | 2/2009 | Martin | B44D 3/126 | 220/309.1 |
| 2009/0127266 | A1 * | 5/2009 | Arvinte | B44D 3/126 | 220/570 |
| 2011/0297685 | A1 * | 12/2011 | Sorenson | B44D 3/127 | 220/570 |
| 2013/0119064 | A1 | 5/2013 | Mackay et al. | | |
| 2016/0001918 | A1 * | 1/2016 | Orion | B65D 11/02 | 220/4.24 |
| 2017/0191251 | A1 * | 7/2017 | Trude | B65D 88/526 | |
| 2021/0008923 | A1 | 1/2021 | Robertson et al. | | |
| 2022/0055400 | A1 * | 2/2022 | Eldridge | B44D 3/126 | |
| 2022/0410618 | A1 * | 12/2022 | Breneman | B44D 3/128 | |
| 2023/0117455 | A1 * | 4/2023 | Zenger | B44D 3/126 | 220/570 |

* cited by examiner

PAINT TRAY LINER AND LID

RELATED APPLICATIONS

This application claims the benefit of U.S. Provisional Application No. 63/214,031 filed Jun. 23, 2021, which is hereby incorporated herein by reference in its entirety.

TECHNICAL FIELD

The present invention relates generally to coating containers, and more particularly to a container liner and lid, such as a paint tray liner and lid.

BACKGROUND

Paint containers commonly are used to hold an amount of a coating, such as paints, sealants, or the like, during the coating application process. Typical containers include buckets, pails, trays, or the like. These containers often will include a removable liner that is disposable or reusable to prevent the container from being coated with paint, thus lengthening the container's usable life. The containers also may be provided with lids to help prevent the coating from being contaminated or drying out if left unattended for a period of time.

SUMMARY

At least one aspect of the present disclosure provides a paint container liner that can be flipped on top of another same liner to provide a liner-lid combination that forms an enclosure for storing a coating and/or coating utensil therewithin.

According to an aspect, the liner includes mirrored male and female features that enable a liner to be flipped on top of and lock onto another such liner.

According to an aspect, the liner includes a rib on an upper rim of the liner that runs about halfway along the rim. When two such liners are combined into the liner-lid enclosure, the respective ribs abut a corresponding top surface of the opposing liner to create a line-to-line face seal around a majority of the liner edge.

According to an aspect, the rib of one liner cooperates with the rib of the opposing liner to form a gap that enables a coating utensil, such as a roller frame handle, to extend therethrough and remain in the liner-lid enclosure while covered. More particularly, in exemplary embodiments the cooperating ribs of the opposing liners may form a section where the ribs are in juxtaposition to each other in laterally spaced apart relationship to define a through-opening for insertion of a handle of the coating utensil.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

The principles and aspects of the present invention have particular application to paint tray liners, and thus will be described below chiefly in this context. It is understood, however, that the principles and aspects of the present invention may be applicable to other containers generally, including other types of coating containers such as buckets, pails, or the like.

Referring to FIGS. 1-9, an exemplary container liner 10 for containing a coating, such as paint, is shown. In the illustrated embodiment, the container liner is configured as a disposable or reusable paint tray liner (also referred to as liner 10) that is adapted to nest within a corresponding paint tray (not shown) in a manner well-known in the art. The paint tray liner 10 may be made of a suitable plastic, such as a thin-walled thermoformed plastic that is made as a one-piece structure.

Figure 1:
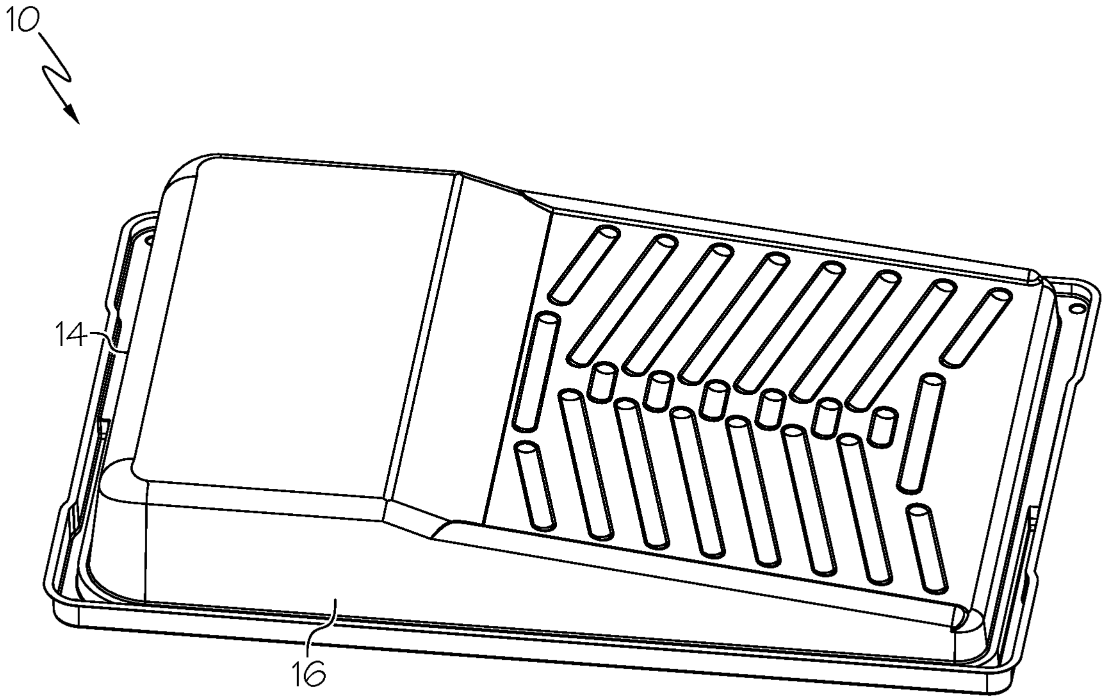
FIG. 1 is a right side bottom perspective view of an exemplary container liner according to an embodiment of the present disclosure.
Figure 2:
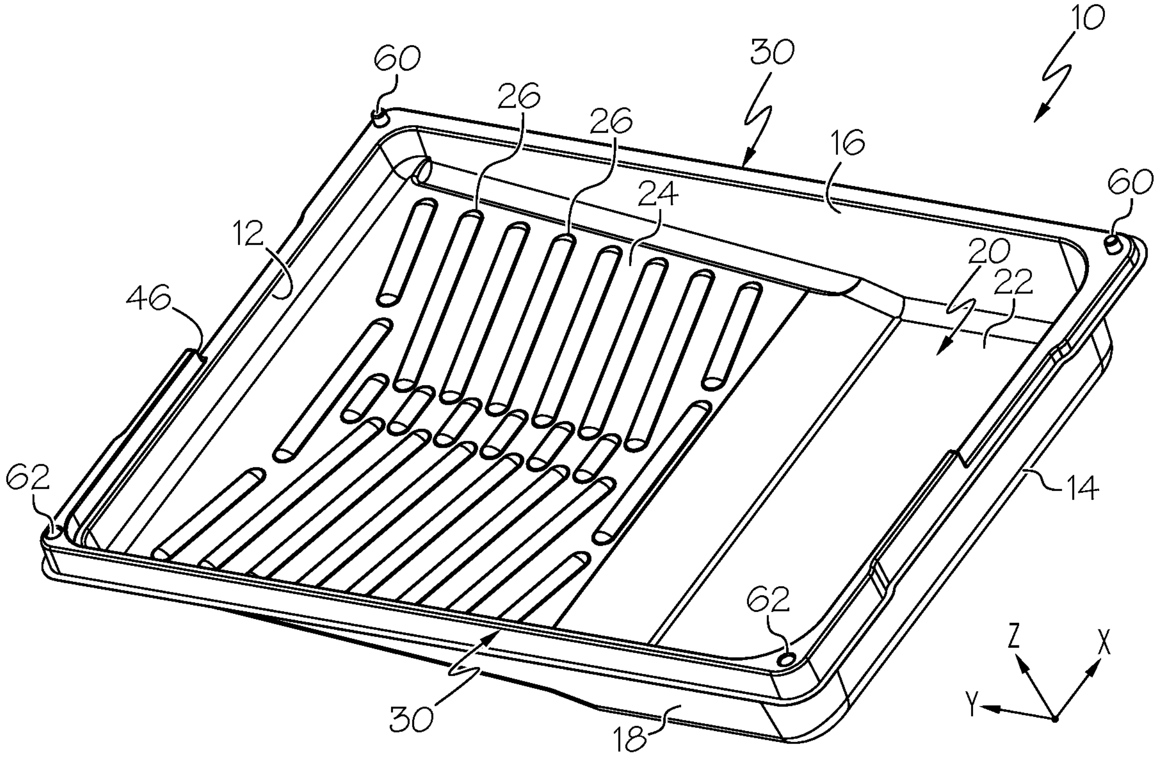
FIG. 2 is a right side top perspective view of the liner shown in FIG. 1.
Figure 4:
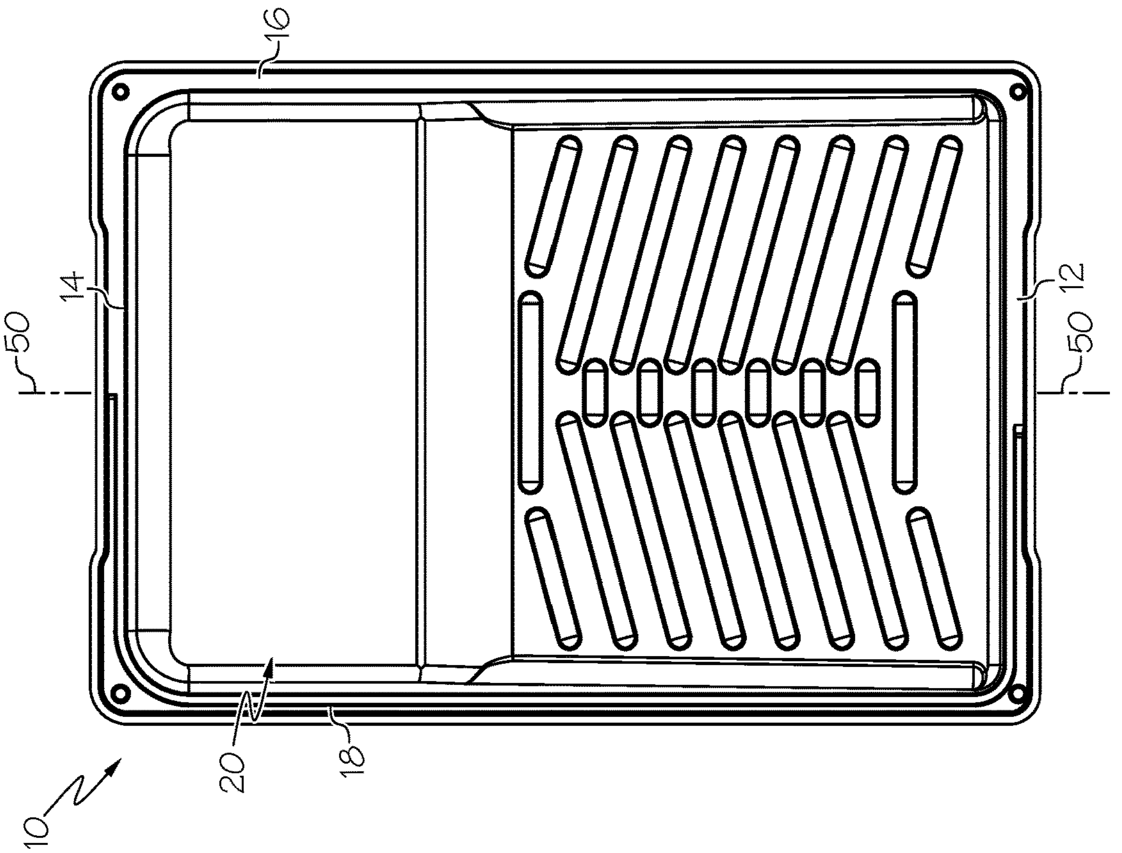
FIG. 4 is a bottom plan view of the liner shown in FIG. 1.
Figure 3:
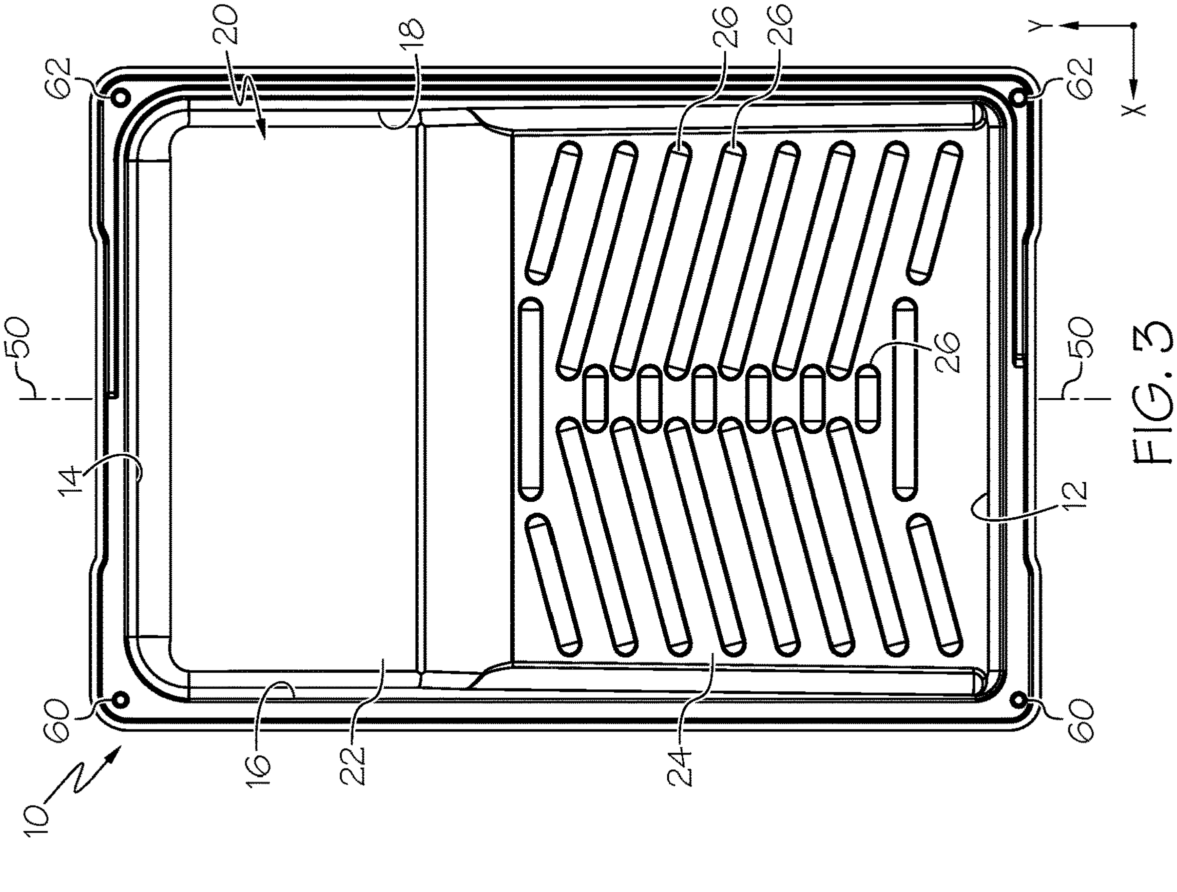
FIG. 3 is a top plan view of the liner shown in FIG. 1.
Figure 5:
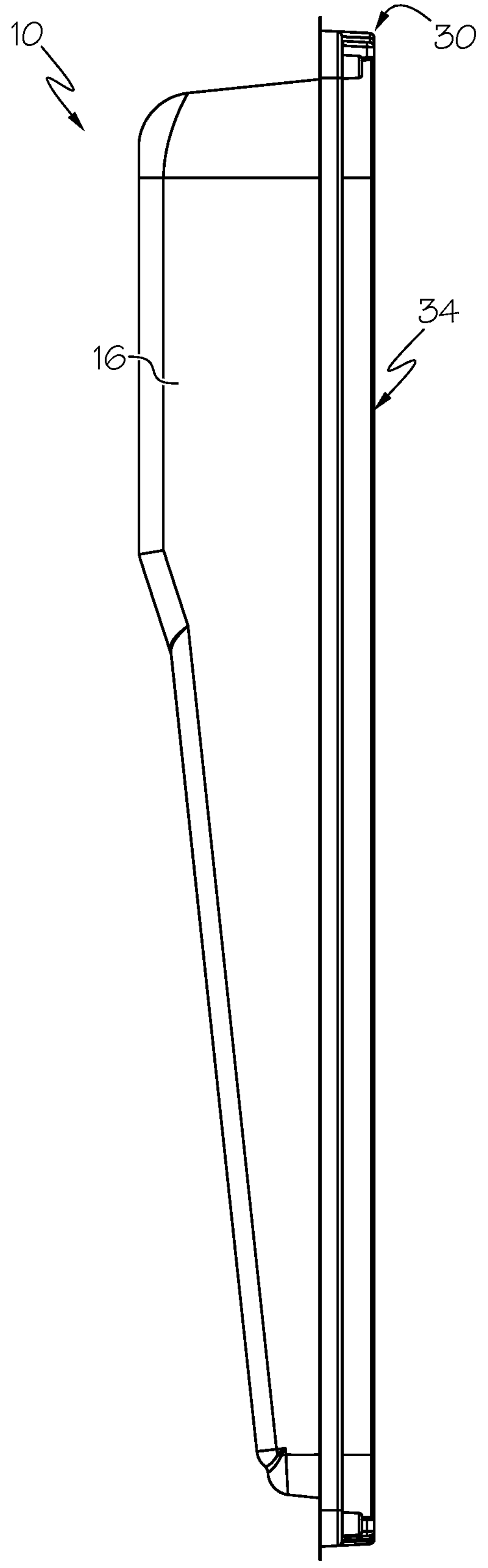
FIG. 5 is a left side view of the liner shown in FIG. 1.
Figure 6:
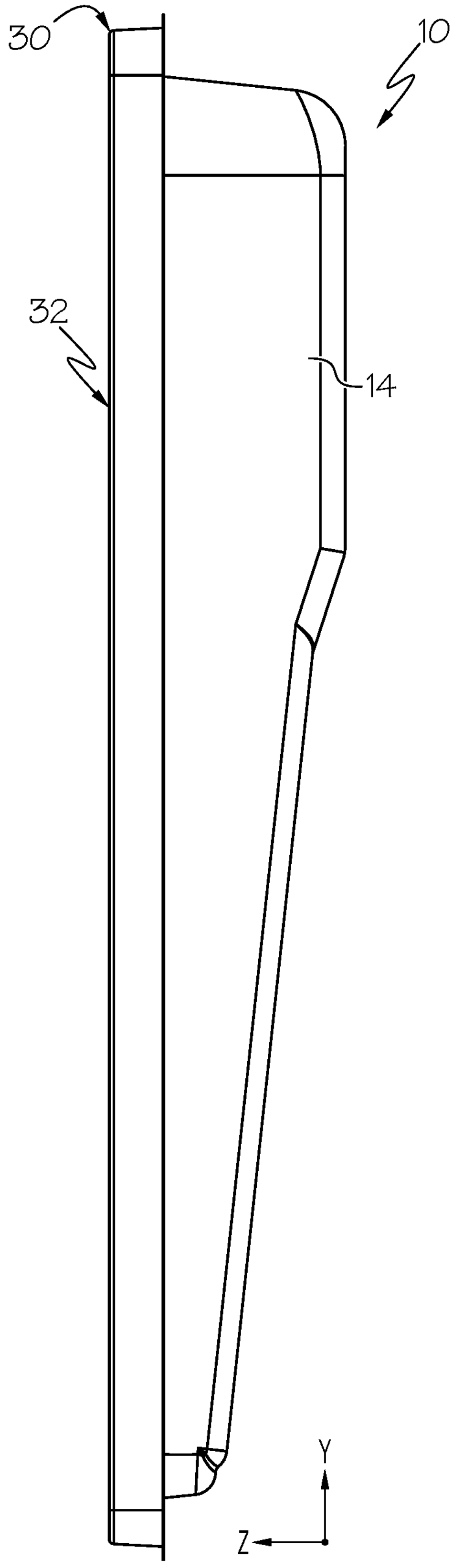
FIG. 6 is a right side view of the liner shown in FIG. 1.

As shown, particularly with reference to FIGS. 2 and 3, the paint tray liner 10 generally includes opposite front and rear sidewalls 12, 14; opposite left and right sidewalls 16, 18; and a base 20, which are operatively connected to one another to form a receptacle for containing paint or other coating. The paint tray liner 10 is elongated in a longitudinal (Y) direction such that the left and right sidewalls 16, 18 are longer in the longitudinal direction than the width of the respective front and rear sidewalls 12, 14 in a lateral (X) direction. The respective sidewalls 12, 14, 16, 18 (referred to collectively with reference 12-18) extend upright relative to the base 20 to form a depth of the liner 10 in a depth (Z) direction. As shown, the base 20 forms a deeper storage well portion 22 toward the rear sidewall 14, and a ramped section 24 extending from the storage well portion 22 toward the front sidewall 12. The ramped section 24 forms a roll-off section, including a plurality of ridges 26 or other protuberances that are configured to remove excess paint from a coating utensil, such as a paint roller or the like.

Turning to FIGS. 10-13, while still referring to FIGS. 1-9, the exemplary liner 10 is shown in combination with another same liner 10. As shown, the liner 10 can be flipped on top of the other same liner 10 to serve as a lid, thereby providing a liner-lid combination that forms an enclosure 100 for storing the paint and/or painting utensil (e.g., roller 5, shown in FIG. 13) therewithin. This helps to prevent the paint or other coating from being contaminated or drying out if left unattended for a period of time, and also facilitates transportation of the paint tray without spillage. Because the respective liners 10 forming the liner-lid enclosure 100 are identical, such a design reduces manufacturing and inventory costs. The exemplary liner design also includes other features that allow the liners 10 to be nestable for storage, allow the liners 10 to be interlocked together when forming the liner-lid enclosure 100, and/or provide access opening(s) between respective parts of each liner 10 to permit a utensil, tool, or other item to extend into the liner-lid enclosure 100 from outside the enclosure, as described in further detail below.

Figure 7:
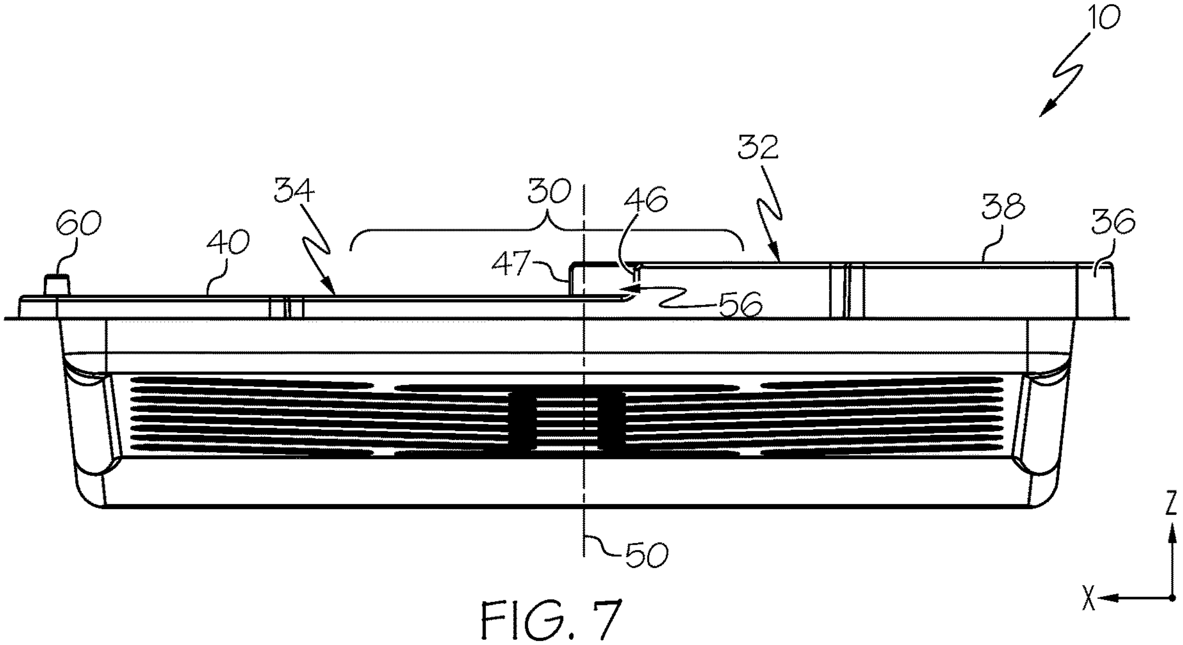
FIG. 7 is a front view of the liner shown in FIG. 1.
Figure 8:
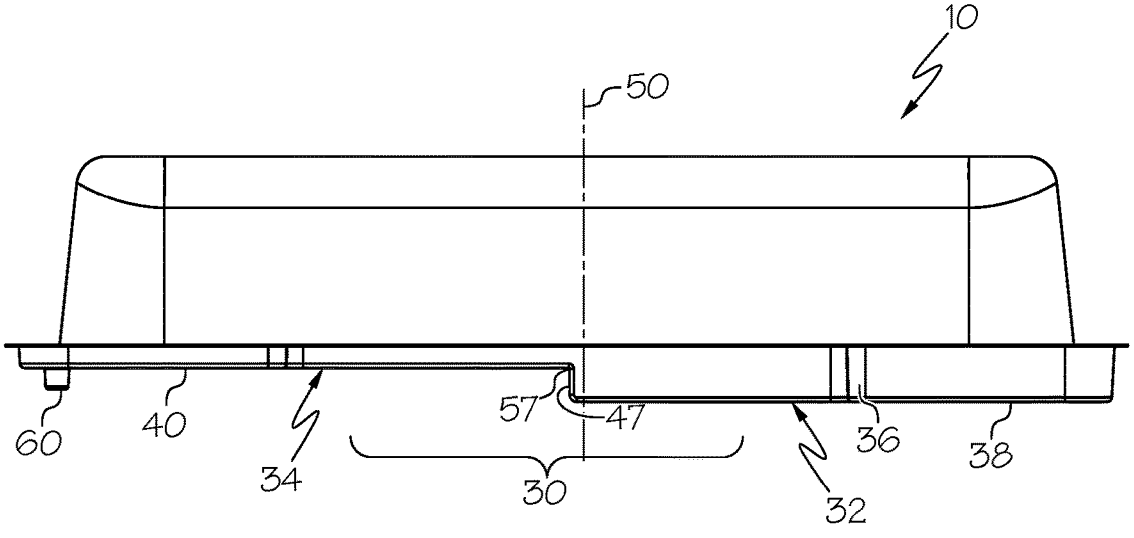
FIG. 8 is a back view of the liner shown in FIG. 1.
Figure 9:
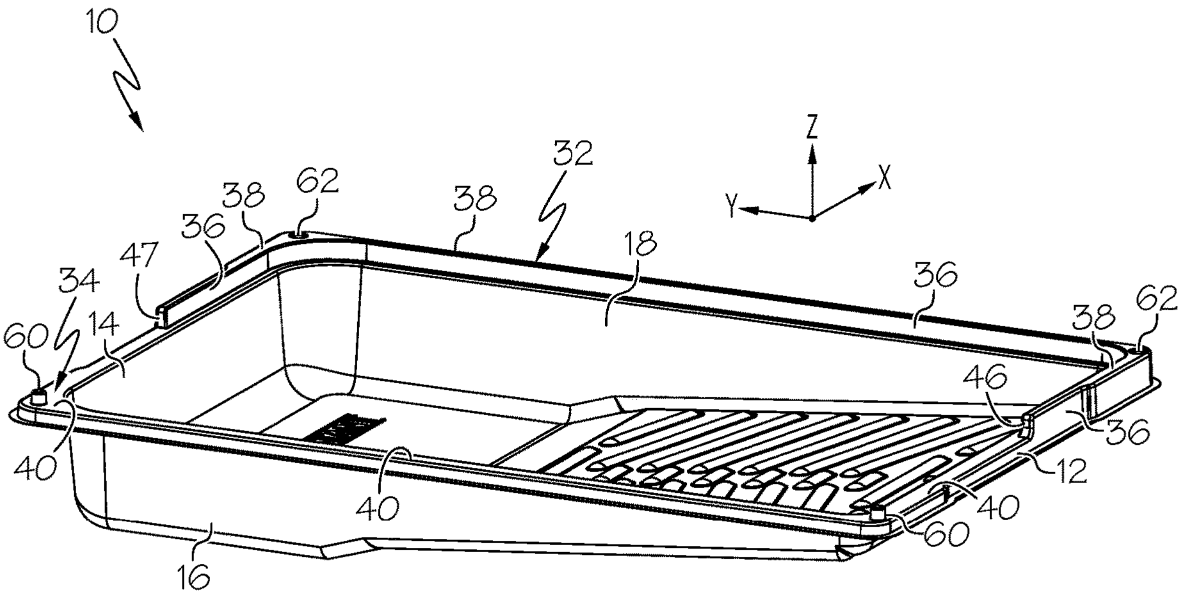
FIG. 9 is a top, left perspective view of the liner shown in FIG. 1.

As shown, particularly with reference to FIGS. 7-9, the respective sidewalls 12-18 of the lid 10 have an upper rim 30 that is configured to interface against a corresponding upper rim 30 of the other same lid 10 to form the lid-liner enclosure 100. In the illustrated embodiment, the respective sidewalls 12-18 cooperate with each other such that the upper rim 30 extends continuously around an entirety of the upper perimeter of the liner 10 and bounds an upper portion of the sidewalls 12-18. As shown, the upper rim 30 includes a first portion 32 and second portion 34 that are at different elevations relative to each other. The first rim portion 32 projects further upwardly than the second rim portion 34 to form a rib 36 having a rib upper face 38. The second rim portion 34 forms a corresponding upper mating face 40 that is at a lower elevation than the rib upper face 38.

As shown in FIGS. 10-13, for example, the first and second upper rim portions 32, 34 are configured with respect to one another such that, when the first liner 10 is flipped over and interfaced against the opposing second liner 10 to serve as the lid, the rib upper face 38 of each liner 10 engages against the corresponding upper mating face 40 of the opposing liner 10 to form a face seal 42 along a majority of the upper rim 30. This face seal interface 42 restricts the coating in the enclosure 100 from spilling out over the rim 30 between the liners 10. The rib upper face 38 and the upper mating face 40 may have any suitable complimentary configuration to provide a suitable face seal interface 42. In the illustrated embodiment, for example, the respective faces 38 and 40 are flat surfaces for complimentarily interfacing against each other.

Figure 13:
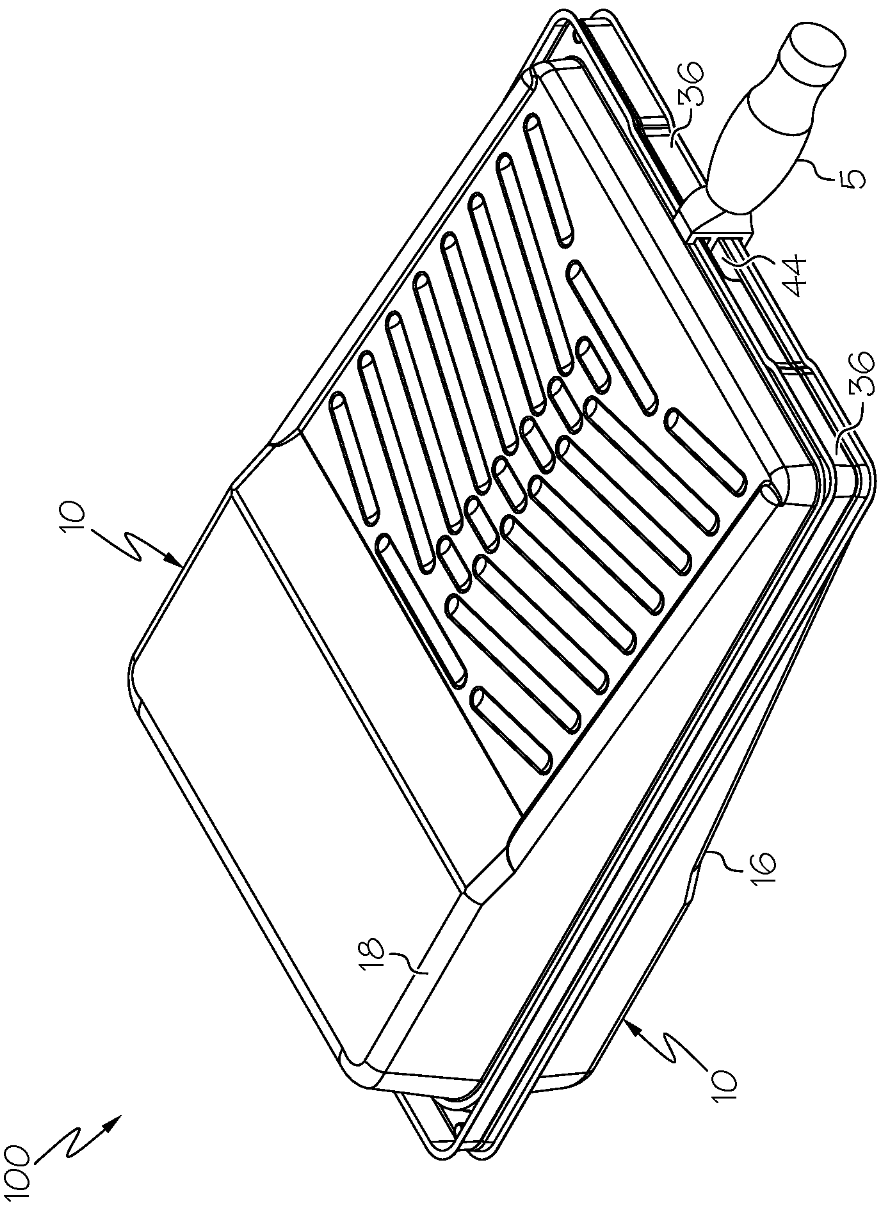
FIG. 13 is a top, right perspective view of the enclosure shown in FIG. 10, in which a handle of a paint roller is placed between the two same lids which form the enclosure.

Also as shown in FIGS. 10-13, the first and second rim portions 32, 34 at the different elevations are configured with respect to one another such that, when the liners 10 are combined into the lid-liner enclosure 100, the liners 10 form at least one section in which the respective projecting ribs 36 of the liners 10 are in juxtaposition to each other in laterally spaced apart relationship to define a through-opening 44 that is configured to permit a portion of a coating utensil to extend therethrough. By way of example, FIG. 13 shows a handle of a paint roller 5 extending through the opening 44 such that the roller portion (hidden from view) can be contained within the enclosure 100 (i.e., in the paint) while the handle can extend outside of the enclosure 100.

In the illustrated embodiment, the opening 44 is formed between upright ends 46 of the ribs 36 of each liner 10 axially overlapping with each other in the depth (Z) direction and being laterally spaced apart from each other in the lateral (X) direction. Proximal the ends 46 of the ribs 36 of each liner 10, the rib upper face 38 engages against the opposing mating face 40 of the second (lower) rim portion 34 to form part of the face seal 42. Respective regions of the mating face 40 of the second (lower) rim portion 34 of each liner 10 is not engaged with a corresponding rib upper face 38, which forms a gap between the respective mating faces 40 of the liners 10. As such, in the illustrated embodiment, the opening 44 is bounded by the opposing and spaced apart rib ends 46 of each liner 10 on the left and right sides, and is bounded by the opposing and spaced apart mating faces 40 of each liner on the upper and lower sides.

To provide such a design with identical liners 10, each liner 10 can be imagined having a plane 50 extending in the longitudinal (Y) direction, perpendicular to the lateral (X) direction, and bisecting the upper rim 30 into first and second upper rim sides 52, 54 (as shown in FIGS. 7 and 8, for example). As shown in the illustrated embodiment, the upwardly projecting rib 36 extends continuously from one end 47 of the rib 36 along part of the rear sidewall 14, along the entirety the right sidewall 18, and along the front sidewall 12, but stops short of the imaginary plane bisecting point 56 at the front of the liner 10. As such, when the opposing liner 10 forming the lid is flipped and mirrored about the imaginary plane 50, the gap between the rib end 46 and the plane 50 forms half of the width of the opening 44. In the illustrated embodiment, the opposite end 47 of the rib 36 extends halfway along the rear sidewall 14 to the bisecting point 57 at the rear of the liner, such that respective ends 47 of the liner-lid enclosure 100 abut each other to provide a sealing engagement. It is understood, however, that the ends 47 of the respective ribs 36 of each liner also could be spaced apart when combined into the enclosure 100 to form another opening at the rear of the liner-lid enclosure 100.

To provide interlocking functionality between the opposingly interfaced liners 10 of the liner-lid enclosure 100, the liner 10 also includes mirrored pairs of male and female locking elements 60, 62. In the illustrated embodiment, the male locking elements 60 are formed as protrusions, such as an integrally molded pin, and the female locking elements 62 are formed as receivers, such as an integrally molded recessed cavity. The male and female locking elements 60, 62 are positioned and shaped such that when the two liners 10 combine to form the liner-lid enclosure 100, the male locking elements 60 are received into the corresponding female locking elements 62 with a friction fit that releasably locks the respective lids 10 together. In the illustrated embodiment, the liner 10 can be imagined having the bisecting plane 50, which bisects the upper rim 30 into first and second upper rim sides 52, 54, and the pair of male locking elements 60 may be on first side 52 and the pair of female locking elements 62 may be on the second side 54 mirrored about the plane 50 (as best shown in FIG. 3). As such, the male locking elements 60 project upwards from the mating face 40 of the second (lower) rim portion 34, and the female locking elements 62 are recessed below the rib upper mating face 38 of the first (upper) rim portion 32. The locking elements 60, 62 may be mirrored at a suitable location along the rim 30, which in the illustrated embodiment is proximal the corners of the liner 10. Other suitable forms of male and female locking elements 60, 62 may be employed, such as resilient snap fit locking elements, for example; however, the integrally molded male projections and female receivers provide an easy to manufacture solution.

Figure 10:
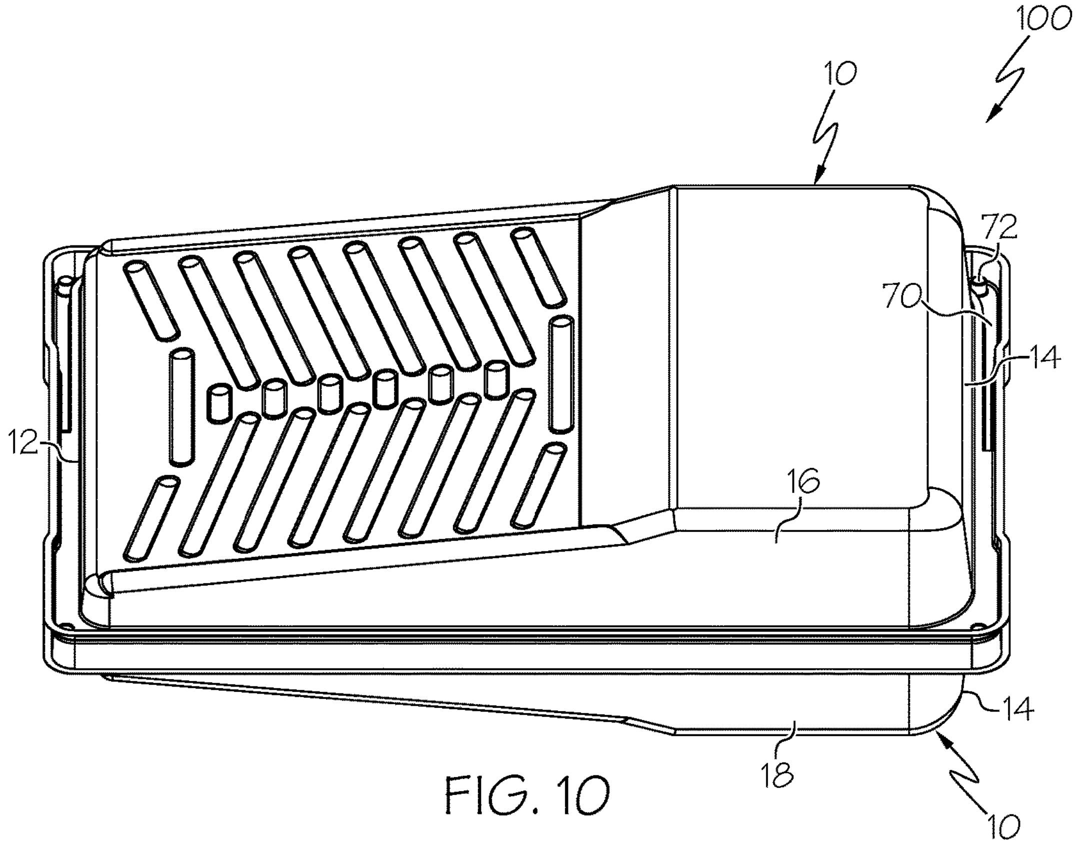
FIG. 10 is a top, right perspective view of the container liner in FIG. 1 combined with another same liner to form a liner-lid enclosure according to an embodiment of the present disclosure.
Figure 11:
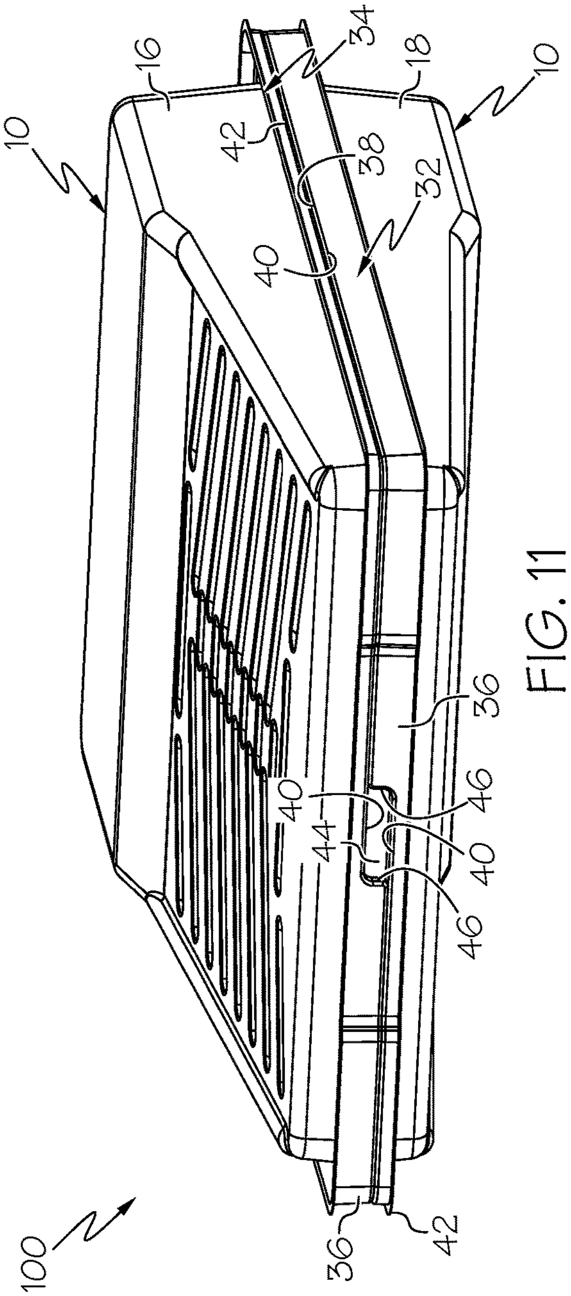
FIG. 11 is a top, right perspective view of the enclosure shown in FIG. 10.
Figure 12:
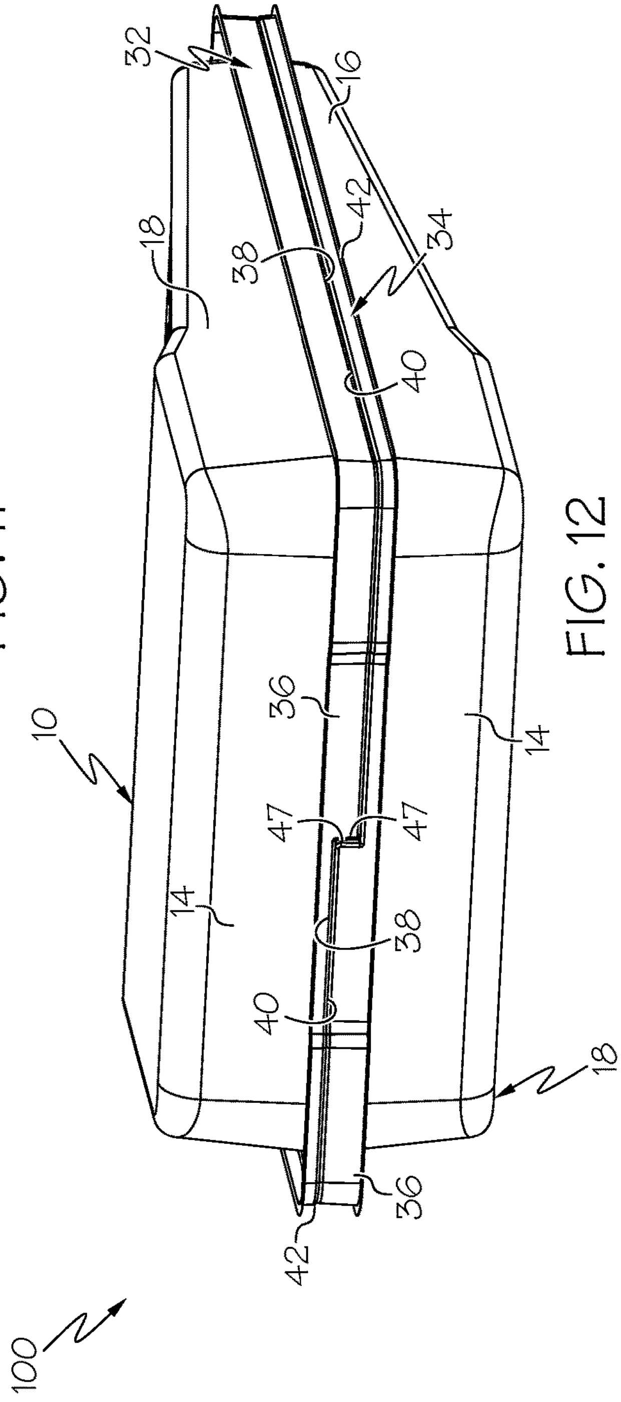
FIG. 12 is a back, right perspective view of the enclosure shown in FIG. 10.

The exemplary liner 10 also provides suitable nesting capability with another same liner 10 when being stored stacked atop each other in a non-enclosure state. This is achieved by male projecting portions of the liner 10 having underlying female recessed portions, and vice versa. As shown in FIG. 10, for example, an underside of the rib 36 forms a deep pocket 70 for receiving the projecting rib 36 of a nested liner 10. Likewise, the underside of the recessed female locking element 62 forms a projection 72 for being received in the recess of the female locking element 62, and the like.

The liner-lid combination may be provided as part of a kit, such as within product packaging, so that pairs of liners 10 are provided to form the liner-lid enclosure 100. The kit may include the paint tray into which the liner 10 fits. The kit also may include painting utensils, or other painting accessories.

Figure 14:
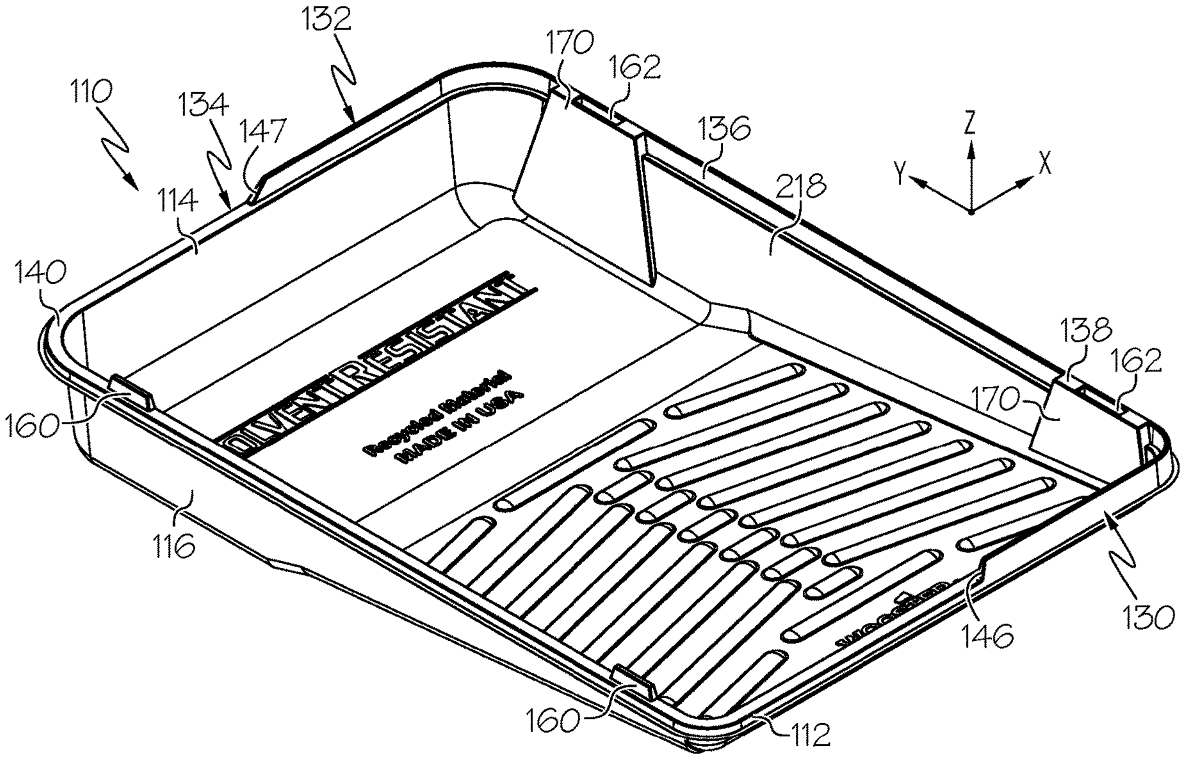
FIG. 14 is a top, left perspective view of an exemplary container liner according to a second embodiment of the present disclosure.
Figure 15:
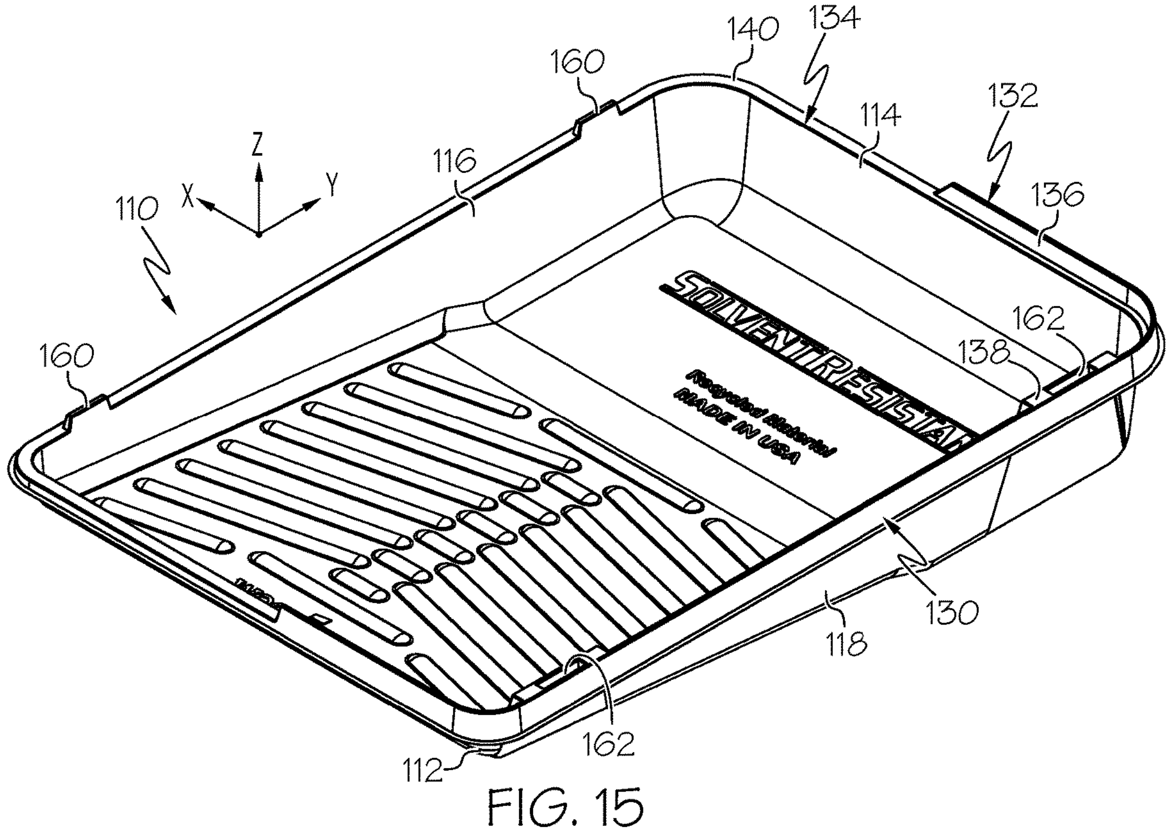
FIG. 15 is a top, right perspective view of the embodiment shown in FIG. 14.

Turning now to FIGS. 14 and 15, another exemplary embodiment of a liner 110 is shown. The liner 110 is substantially the same as the above-referenced liner 10, and consequently the same reference numerals, but in the 100-series are used to denote structures corresponding to similar structures in the liner 10. In addition, the foregoing description of the liner 10 is equally applicable to the liner 110 except as noted below. It is also understood that aspects of the previous embodiment of the liner 10 and the current embodiment of the liner 110 may be substituted for one another or used in conjunction with one another where applicable.

Similarly to the liner 10, the liner 110 includes respective sidewalls 112, 114, 116, 118 of the lid 110 have an upper rim 130 that is configured to interface against a corresponding upper rim 130 of the other same liner 110 to form the lid-liner enclosure 100. In the illustrated embodiment, the respective sidewalls 112-118 cooperate with each other such that the upper rim 130 extends continuously around an entirety of the upper perimeter of the liner 110 and bounds an upper portion of the sidewalls 112-118. As shown, the upper rim 130 includes a first portion 132 and second portion 134 that are at different elevations relative to each other. The first rim portion 132 projects further upwardly than the second rim portion 134 to form a rib 136 having a rib upper face 138. The second rim portion 134 forms a corresponding upper mating face 140 that is at a lower elevation than the rib upper face 138. As such, the first and second rim portions 132, 134 at the different elevations are configured with respect to one another such that, when two of the same liners 110 are combined into a lid-liner enclosure (not shown), the liners 110 form at least one section in which the respective projecting ribs 136 of the liners 110 are in juxtaposition to each other in laterally spaced apart relationship to define a through-opening (see e.g., similar opening 44 in FIG. 13) that is configured to permit a portion of a coating utensil to extend therethrough.

As shown, the liner 110 has different locking elements than liner 10 to provide interlocking functionality between the opposingly interfaced liners 110 of the liner-lid enclosure (not shown). In the illustrated embodiment, the liner 110 includes mirrored pairs of male and female locking elements 160, 162 in which the male locking elements 160 are in the form of protrusions, such as locking lugs 160, and the female locking elements 162 are formed as receivers, such as an opening in the rim or an integrally molded recessed cavity 162. The male and female locking elements 160, 162 are positioned and shaped such that when the two liners 110 combine to form the liner-lid enclosure, the locking lugs 160 are received into the corresponding receiver openings 162 with a friction fit that releasably locks the respective liners 110 together. The locking lugs 160 project upwards from the mating face 40 of the second (lower) rim portion 134, and the female locking elements 162 are recessed below the rib upper mating face 38 of the first (upper) rim portion 132. The locking elements 160, 162 may be mirrored at a suitable location along the rim 130, which in the illustrated embodiment is proximal the corners of the liner 110.

As shown, the liner 110 also includes a feature of laterally enlarged portions 170 on the rim to accommodate the width of the female openings 162 for receiving the corresponding locking lugs 160. These laterally enlarged portions 170 include opposite vertical surfaces on the inside and outside of the liner that form an offset (e.g., protrusion on the inside and recess on the outside) that allow the liners 110 to be stacked in a way that promotes product nesting. In this manner, the outer vertical surface forming one side of the enlarged portion 170 (e.g., the recessed portion) is configured such that it receives the inside vertical surface forming the other side of the enlarged portion 170 (e.g., the protruding portion) and is able to fit snugly inside of the first paint tray while their respective faces are both oriented in the same respective directions.

Figure 16:
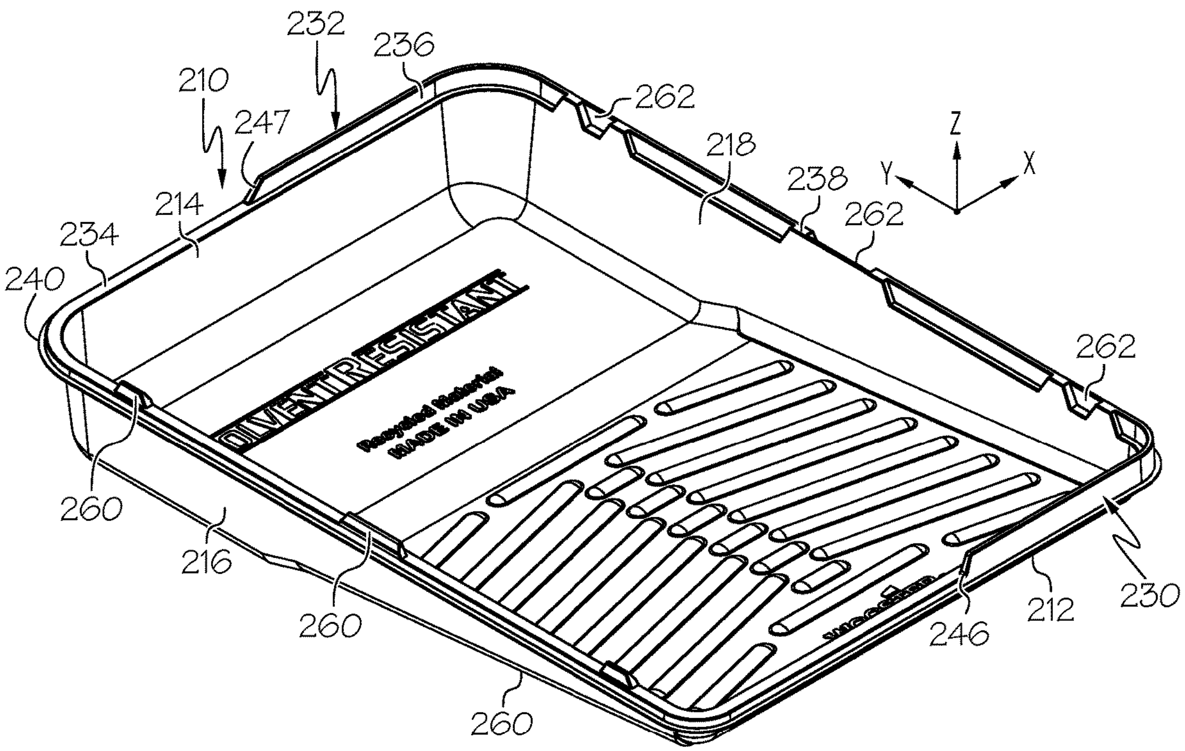
FIG. 16 is a top, left perspective view of an exemplary container liner according to a third embodiment of the present disclosure.
Figure 17:
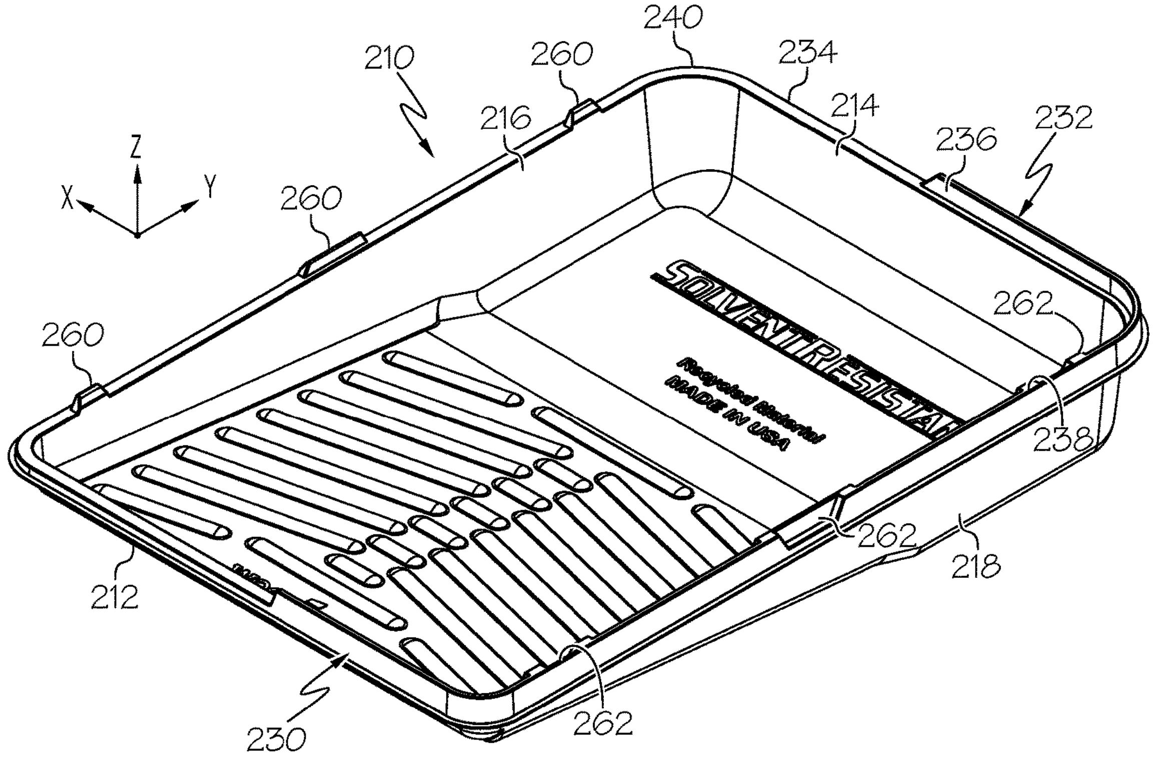
FIG. 17 is top, right perspective view of the embodiment shown in FIG. 16.

Turning to FIGS. 16 and 17, another exemplary embodiment of a liner 210 is shown. The liner 210 is substantially the same as the above-referenced paint tray 10, and consequently the same reference numerals but in the 200-series are used to denote structures corresponding to similar structures in the liners 10 and 110. In addition, the foregoing description of the liners 10, 110 is equally applicable to the liner 210, except as noted below. It is also understood that aspects of the liners 10, 110 and/or the liner 210 may be substituted for one another or used in conjunction with one another where applicable.

Similarly to the liners 10 and 110, the liner 210 includes respective sidewalls 212, 214, 216, 218 of the lid 210 have an upper rim 230 that is configured to interface against a corresponding upper rim 230 of the other same liner 210 to form the lid-liner enclosure (not shown). In the illustrated embodiment, the respective sidewalls 212-218 cooperate with each other such that the upper rim 230 extends continuously around an entirety of the upper perimeter of the liner 210 and bounds an upper portion of the sidewalls 212-218. As shown, the upper rim 230 includes a first portion 232 and second portion 234 that are at different elevations relative to each other. The first rim portion 232 projects further upwardly than the second rim portion 234 to form a rib 236 having a rib upper face 238. The second rim portion 234 forms a corresponding upper mating face 240 that is at a lower elevation than the rib upper face 238. As such, the first and second rim portions 232, 234 at the different elevations are configured with respect to one another such that, when two of the same liners 210 are combined into a lid-liner enclosure, the liners 210 form at least one section in which the respective projecting ribs 236 of the liners 210 are in juxtaposition to each other in laterally spaced apart relationship to define a through-opening (see e.g., similar opening 44 in FIG. 13) that is configured to permit a portion of a coating utensil to extend therethrough.

As shown, the liner 210 has a different locking elements than liners 10 and 110. To provide interlocking functionality between the opposingly interfaced liners 210 of the liner-lid enclosure (not shown), the liner 210 also includes mirrored pairs of male and female locking elements 260, 262. In the illustrated embodiment, the male locking elements 260 are formed as protrusions, such as an integrally molded tab 260, and the female locking elements 262 are formed as receivers, such as an integrally molded slot 262. The male and female locking elements 260, 262 are positioned and shaped such that when the two liners 210 combine to form the liner-lid enclosure 100, the tabs 260 are received into the corresponding tabs 262 with a friction fit that releasably locks the respective liners 210 together. As shown, one or more of the slots 262 may be formed on an inside of the liner 210, and one or more other slots 262 may be formed on an outside of the liner. The corresponding tabs 260 may be shaped with a tapered profile based on the position of the slots 262.

Exemplary liner(s) or tray(s) have been shown and described herein, although it is understood that alterations or modifications may be provided based on the understanding of the present disclosure.

According to an aspect of the present disclosure, a container liner for containing a coating, includes: opposite front and rear sidewalls, opposite left and right sidewalls, and a base, the respective sidewalls and base being operatively connected to one another to form a receptacle for containing at least the coating; the respective sidewalls providing an upper rim, wherein a first portion of the upper rim projects further upwardly than a second portion of the upper rim to form a rib having a rib upper face, and the second portion of the upper rim forms an upper mating face at a lower elevation than the rib upper face; wherein the respective first and second portions of the upper rim are configured with respect to one another such that, when the container liner is flipped over and opposingly interfaced against another same container liner to serve as a lid and thereby form a liner-lid enclosure: (i) the rib upper face engages against the corresponding upper mating face of the other same liner to form a face seal along a majority of the upper rim; and (ii) the opposingly interfaced liners form a section in which the ribs of the respective liners are in juxtaposition to each other in laterally spaced apart relationship to define a through-opening that is configured to permit a portion of a coating utensil to extend therethrough.

Exemplary embodiment(s) may include one or more of the following additional features, separately or in any combination.

In exemplary embodiment(s), the respective sidewalls cooperate with each other such that the upper rim extends continuously around an entirety of the upper perimeter of the liner and bounds an upper portion of the sidewalls.

In exemplary embodiment(s), the lid is configured such that when forming the liner-lid enclosure, the opening is formed between upright ends of the ribs of each liner axially overlapping with each other in the depth (Z) direction and being laterally spaced apart from each other in the lateral (X) direction.

In exemplary embodiment(s), the lid is configured such that when forming the liner-lid enclosure, the opening is bounded by opposing and spaced apart rib ends of each liner on the left and right sides, and is bounded by the opposing and spaced apart upper mating faces of the respective second rim portions of each liner on the upper and lower sides of the opening.

In exemplary embodiment(s), the rib extends along at least a majority of one of the sidewalls.

In exemplary embodiment(s), the rim is bisected by a plane that is perpendicular to an upper surface of the rim to provide first and second sides of the upper rim on opposite sides of the bisecting plane; and wherein the rib extends continuously from one end of the rib along part of the rear sidewall, along the entirety the right sidewall, and along the front sidewall, such that a second rib end is spaced apart from the imaginary plane bisecting a point at the front of the liner.

In exemplary embodiment(s), the one end of the rib extends halfway along the rear sidewall to a bisecting point at the rear of the liner, such that, when forming the liner-lid enclosure, the respective one rib ends of the respective lids abut each other to provide a sealing engagement.

In exemplary embodiment(s), the rib upper face and the mating face of the second rib portion are flat surfaces for complimentarily interfacing against each other when forming the liner-lid enclosure.

In exemplary embodiment(s), further comprising male locking elements and female locking elements, the male and female locking elements being positioned and shaped such that when the two liners combine to form the liner-lid enclosure, the male locking elements are received into the corresponding female locking elements with a friction fit that releasably locks the respective lids together.

In exemplary embodiment(s), the male locking elements are formed as protrusions and the female locking elements are recessed receivers; and wherein the male locking elements project upwards from the mating face of the second rim portion, and the female locking elements are recessed below the rib upper mating face of the first rim portion.

In exemplary embodiment(s), male components of the liner define corresponding female components underlying the male components, such that multiple such liners can be nested into one another.

In exemplary embodiment(s), the container liner is adapted for a paint tray, such that the liner includes a storage well portion toward the rear sidewall, and a ramped section extending from the storage well portion toward the front sidewall, the ramped section including a plurality of ridges to provide a roll-off section.

According to another aspect, a container liner for containing a coating, includes: opposite front and rear sidewalls, opposite left and right sidewalls, and a base, the respective sidewalls and base being operatively connected to one another to form a receptacle for containing at least the coating, the respective sidewalls cooperating with each other to having a continuous upper rim around an upper perimeter of the container liner; wherein the upper rim is bisected by a plane that is perpendicular to an upper surface of the upper rim to provide first and second sides of the upper rim on opposite sides of the bisecting plane, wherein the first side of the upper rim includes a pair of male locking elements, and the second side of the upper rim includes a pair of female locking elements, the respective pairs of male and female locking elements being positioned and shaped such that when the container liner is flipped over and opposingly interfaced against another same container liner to serve as a lid and thereby form a liner-lid enclosure, the pair of male locking elements are received into the corresponding pair of female locking elements to releasably lock the respective lids together.

According to another aspect, the liner lid according to any of the forgoing is combined with another same liner lid to form a liner-lid enclosure.

According to another aspect, a kit includes at least two of the liner lids according to any of the foregoing, in which the at least two liner lids are stacked and nested together.

In exemplary embodiment(s), the kit further includes a paint tray.

According to another aspect, the ornamental design for a container liner as shown and described with respect to any of FIGS. 1-17, in which any portion of the liner either via natural delineations or otherwise may be claimed or disclaimed. It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

It is to be understood that all ranges and ratio limits disclosed in the specification and claims may be combined in any manner, including all values, ranges and subranges between the stated values. It is to be understood that unless specifically stated otherwise, references to "a," "an," and/or "the" may include one or more than one, and that reference to an item in the singular may also include the item in the plural.

The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The transitional words or phrases, such as "comprising," "including," "carrying," "having," "containing," "involving," "holding," "made from/of," and the like, are to be understood to be open-ended, i.e., to mean including but not limited to.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A container liner for containing a coating, comprising:

a base; and sidewalls forming a rim raised from the base and including opposite front and rear sidewalls, and opposite left and right sidewalls, wherein the sidewalls and the base are operatively connected to form a receptacle;

wherein the rim sidewalls include an elevated rim section and a lower rim selection;

wherein the rim further includes male locking elements and female locking elements;

wherein the rim includes a spacing located at a transition between the elevated rim section and the lower rim section at the front sidewall wherein the elevated rim section is located on one side of the spacing and the lower rim section is located on the other side of the spacing;

wherein the elevated rim section and the lower rim section are configured with respect to one another such that, when a first container liner is flipped over and opposingly interfaced against a second identical container liner to serve as a lid and thereby form a liner-lid enclosure:

(i) the elevated rim sections engage with the lower rim sections to form a face seal along the rims with an opening formed at the spacing located at front sidewalls of both the first and second container liners; and (ii) the opening is configured to permit a portion of a coating utensil to extend therethrough.

2. The liner according to claim 1, wherein the respective sidewalls cooperate with each other such that the rim extends continuously around an entirety of an upper perimeter of the liner and bounds an upper portion of the sidewalls.

3. The liner according to claim 1, wherein the lid is configured such that when forming the liner-lid enclosure, the opening is formed between upright ends of the rims of each liner axially overlapping with each other in the depth (Z) direction and being laterally spaced apart from each other in the lateral (X) direction.

4. The liner according to claim 1, wherein the lid is configured such that when forming the liner-lid enclosure, the opening is bounded by opposing and spaced apart elevated rim sections of each liner on the left and right sides.

5. The liner according to claim 1, wherein the rim extends along at least a majority of one of the sidewalls.

6. The liner according to claim 1, wherein the rim is bisected by a plane that is perpendicular to an upper surface of the rim to provide first and second sides of the upper rim on opposite sides of the bisecting plane; and wherein the rim extends continuously from one end of the rim along part of the rear sidewall, along the entirety the right sidewall, and along the front sidewall, such that a second rim end is spaced apart from an imaginary plane bisecting a point at the front of the liner.

7. The liner according to claim 6, wherein the one end of the rim extends halfway along the rear sidewall to a bisecting point at the rear of the liner, such that, when forming the liner-lid enclosure, the respective one rim ends of the respective lids abut each other to provide a sealing engagement.

8. The liner according to claim 1, wherein the rim upper face and the rim lower face are flat surfaces for complimentarily interfacing against each other when forming the liner-lid enclosure.

9. The liner according to claim 1, wherein the male and female locking elements are positioned and shaped such that when the two liners combine to form the liner-lid enclosure, the male locking elements are received into the corresponding female locking elements with a friction fit that releasably locks the respective lids together.

10. The liner according to claim 9, wherein the male locking elements are formed as protrusions and the female locking elements are recessed receivers; and wherein the male locking elements project upwards from the rim lower face and the female locking elements are recessed below the rim upper face.

11. The liner according to claim 1, wherein male components of the liner define corresponding female components underlying the male components, such that multiple such liners can be nested into one another.

12. The liner according to claim 1, wherein the container liner is adapted for a paint tray, such that the liner includes a storage well portion toward the rear sidewall, and a ramped section extending from the storage well portion toward the front sidewall, the ramped section including a plurality of ridges to provide a roll-off section.

13. The liner lid according to claim 1, combined with another same liner lid to form a liner-lid enclosure.

14. A kit comprising, a plurality of liner lids according to claim 1, in which the plurality of liner lids are stacked and nested together.

15. The kit according to claim 14, further comprising a paint tray.

* * * * *